United States Patent [19]

Rule

[11] 4,197,341
[45] Apr. 8, 1980

[54] CELLULAR CORE STRUCTURAL PANEL COMPONENTS, STRUCTURAL PANEL FORMED THEREFROM AND METHOD OF MAKING

[75] Inventor: Edwin L. Rule, Berkeley, Calif.

[73] Assignee: Hexcel Corporation, San Francisco, Calif.

[21] Appl. No.: 774,374

[22] Filed: Mar. 4, 1977

[51] Int. Cl.² .......................... B32B 3/12; B32B 3/28
[52] U.S. Cl. ..................... 428/118; 93/1 H;
156/210; 156/227; 156/250; 264/285; 264/294;
428/116; 428/119; 428/156; 428/164; 428/179;
428/182; 428/593
[58] Field of Search ................ 428/73, 116, 156, 164,
428/178, 179, 182, 186, 593–595, 603, 118;
181/284; 156/210, 227, 250; 93/1 H;
264/285–286, 294

[56] References Cited

U.S. PATENT DOCUMENTS

| | | | |
|---|---|---|---|
| 2,609,315 | 9/1952 | Engel et al. | 156/210 |
| 3,017,971 | 1/1962 | Christman | 428/593 |
| 3,678,558 | 7/1972 | Fredericks | 428/118 |
| 3,821,999 | 7/1974 | Guess et al. | 428/116 |

FOREIGN PATENT DOCUMENTS 1373063  11/1974  United Kingdom ............. 428/116

Primary Examiner—George F. Lesmes
Assistant Examiner—P. Thibodeau
Attorney, Agent, or Firm—John F. O'Flaherty

[57] ABSTRACT

Disclosed is a cellular core structural panel, comprising a plurality of bonded stacked segments, each segment being formed from a sheet characterized by a top portion having repeating peaks and troughs and sidewalls integral with the troughs. The cut-to-length segments are successively aligned so that each peak contacts the trough of the segment above it to form a cellular core panel with integral face sheets formed from the sidewalls of each segment.

32 Claims, 14 Drawing Figures

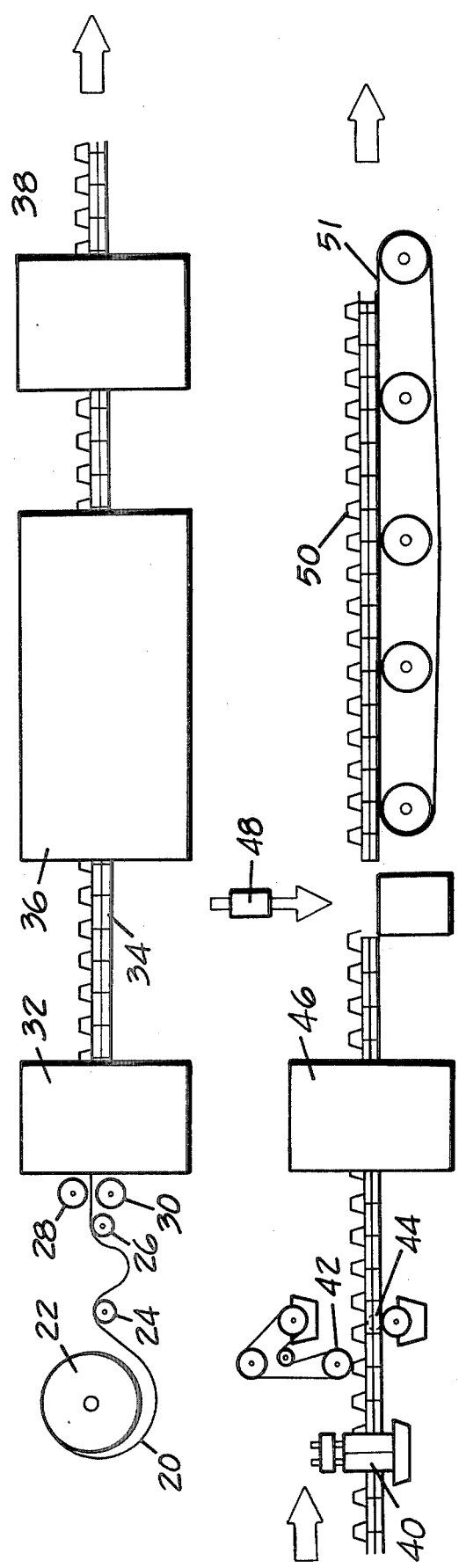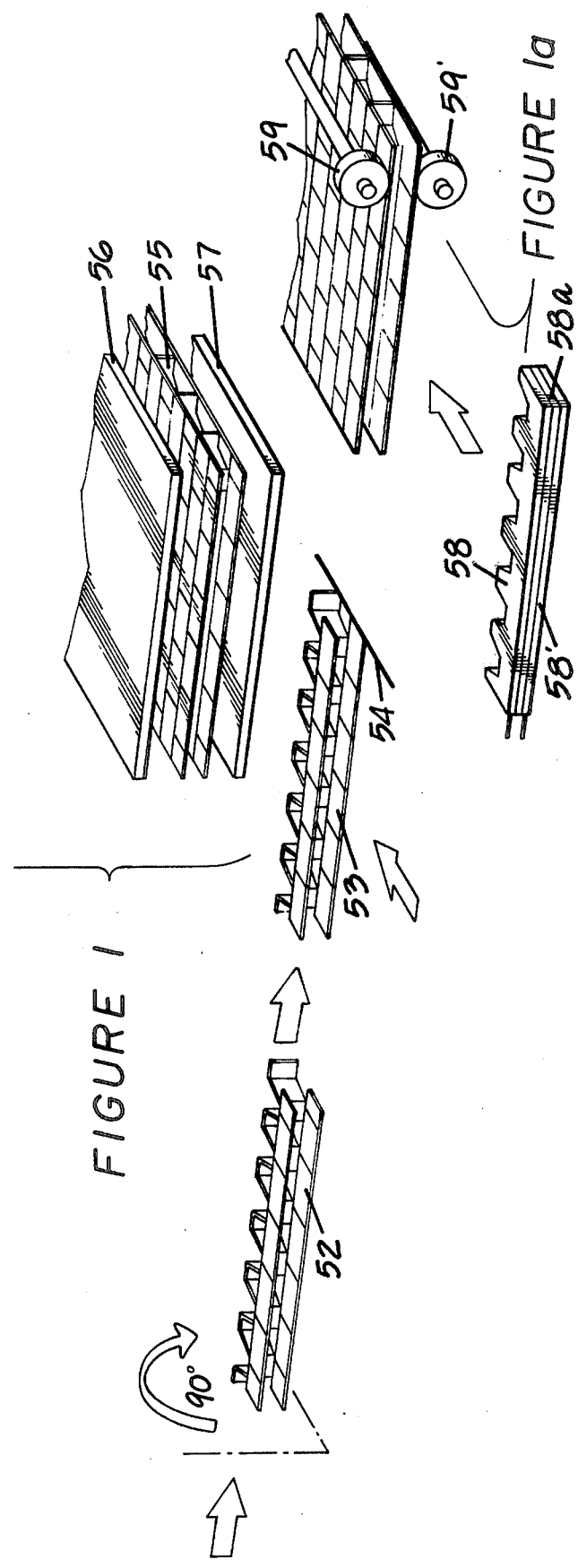

FIGURE 11.
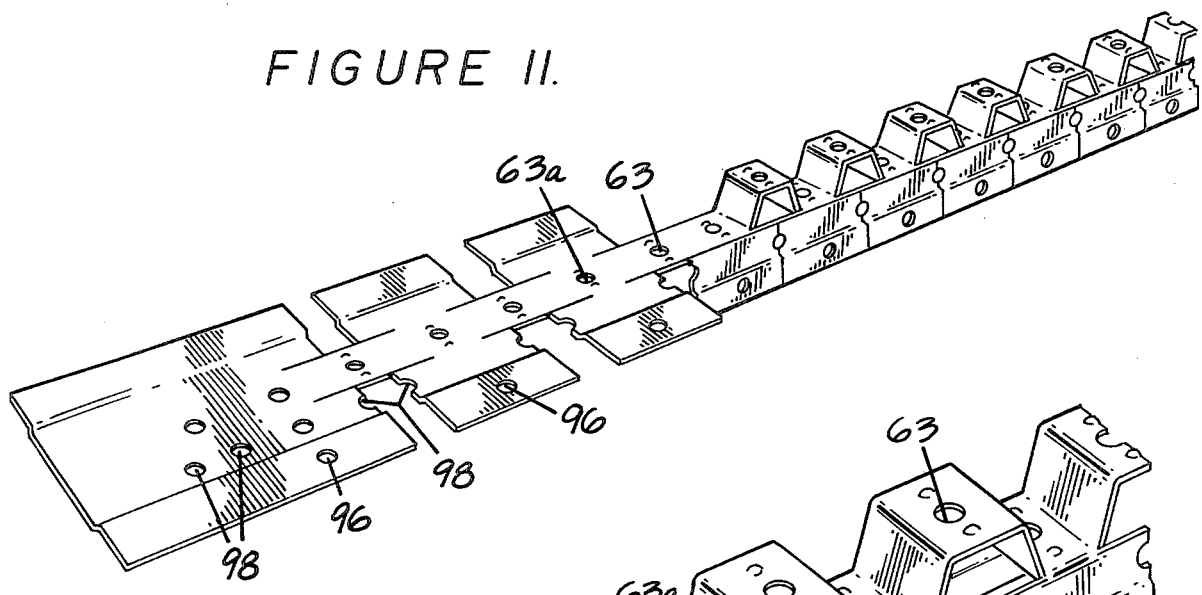
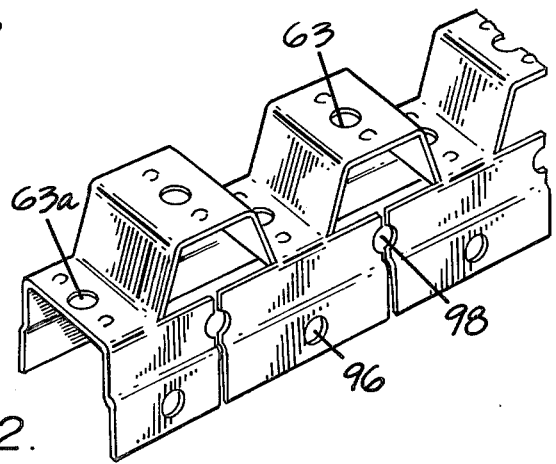
FIGURE 12.
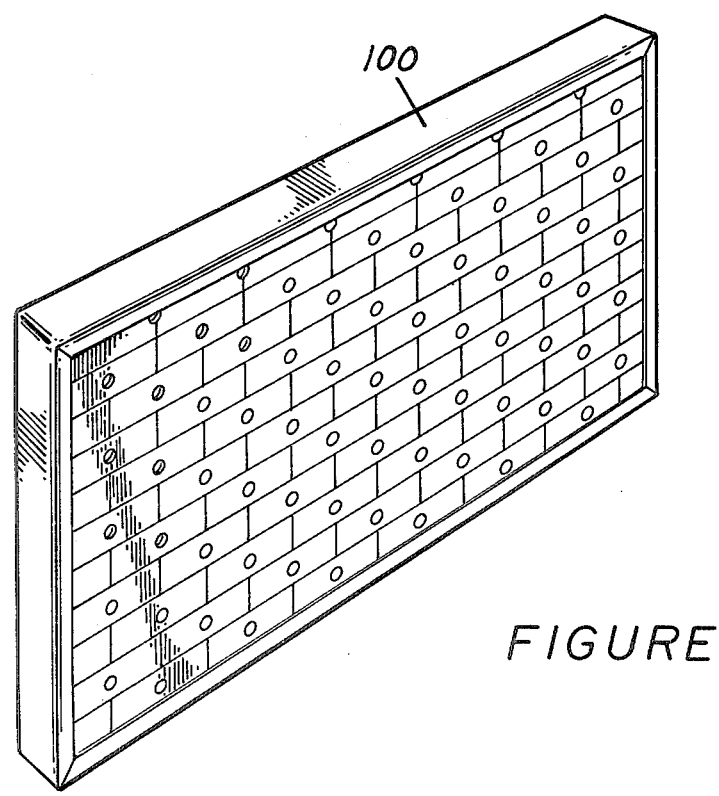
FIGURE 13.

CELLULAR CORE STRUCTURAL PANEL COMPONENTS, STRUCTURAL PANEL FORMED THEREFROM AND METHOD OF MAKING

BACKGROUND OF THE INVENTION

This invention relates to cellular core structural panels and more particularly, to honeycomb type core panel with face sheets which are not laminated to the core by conventional means.

Honeycomb materials made of paper, metal or plastic are widely used as a core material in the manufacture of panels. Such panels find application for various industrial uses where high strength to weight ratios are desirable. They are widely used in the aerospace industry for air frame parts, as well as in the construction industry for doors, shelves, partitions, accoustical panels, etc. Also, they have found use in the transportation industry, as, for example, in busses and recreational vehicles. The lightweight feature of honeycomb core panels, essential in the aerospace industry for many years, has now become more attractive for other type transportation vehicles where it is increasingly desirable to reduce weight and hence fuel consumption.

To date, honeycomb core structural panels have been fabricated by laminating face sheets or "skins" to the cellular core, by adhesive bonding or brazing, as for example, in U.S. Pat. No. 3,257,253 "Laminated Cellular Panel" or U.S. Pat. No. 3,365,787 "Method of Making Metal Honeycomb Sandwich Structure". In U.S. Pat. No. 2,910,153 "Structural Panel of Honeycomb Type", a thin flange is provided on the upper and lower edge of each core strip. The flange is recessed in areas where it is to mate with an adjacent core strip, so the core strips may be resistance welded directly to one another.

Conventional laminating techniques require first fabricating the honeycomb core and then laminating separate face sheets by adhesively bonding, brazing or welding. On account of the separate sheet lamination, close thickness tolerances for the core must be maintained so the face sheets may be bonded to the core along its entire surface. Also, during bonding, care must be taken that pressure is applied to the face sheets directly normal to the core so no sideway slippage occurs. The panel is usually trimmed to size and formed after the laminating steps.

It is an object of this invention to provide a method of manufacturing a cellular core structural panel in one continuous process.

It is a further object of this invention to eliminate the need of laminating separate skins to core material in manufacturing a cellular core panel and to provide a process in which the skin is integral with the core.

It is another object of this invention to provide a method of manufacturing a completed cellular core panel from a coil of continuous sheet material.

It is another object of this invention to provide a process to manufacture panels of varying sizes without the need for cutting or carving separate core material.

SUMMARY OF THE INVENTION

These and other objects are accomplished by forming from a substantially flat sheet or foil a three-dimensional component characterized by a top portion having repeating peaks and troughs and at least one sidewall, at least a portion of the upper edge of which is integral with the troughs and the distance from the upper to the lower edge of the sidewall is at least twice the vertical distance between the peaks and troughs. These components, upon being stacked, aligned and bonded together, form a cellular core structural panel without the requirement for bonding additional face sheets to the core.

BRIEF DESCRIPTION OF THE DRAWINGS

FIG. 1 illustrates the method of forming the cellular core structural panel from a continuous coil of material.

FIG. 1a illustrates a method of bonding the panel via resistance welding.

FIG. 11 illustrates an alternate embodiment for forming the sheet material to provide openings in the final panel.

FIG. 12 is a view of a portion of the segment formed and shown in FIG. 11.

FIG. 13 illustrates a finished panel, with a closeout, which may be used for accoustical applications.

DETAILED DESCRIPTION OF THE INVENTION

Referring to FIG. 1, the process of this invention contemplates the formation of a finished, cellular core structural panel, via a continuous process, from a coil of material. The web, 20, may be any material, including metal, plastic or paper, which will maintain its form when bent and formed into a three-dimensional configuration. The web may be in the form of a coil, 22, or it may be in the form of a flat sheet. The sheet or coil is fed into a typical accumulator section, 24 and 26, and through feed rollers 28 and 30.

Figure 2:
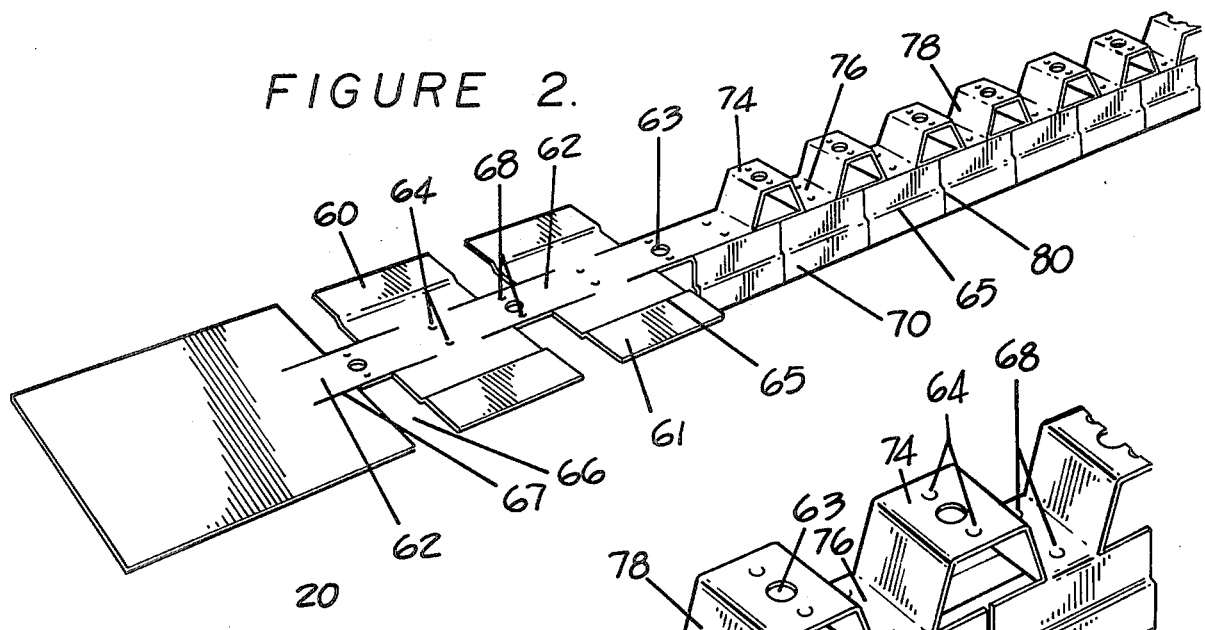
FIG. 2 illustrates the progressive stamping operations that pierce, form and offset the continuous ribbon sheet of material.
Figure 3:
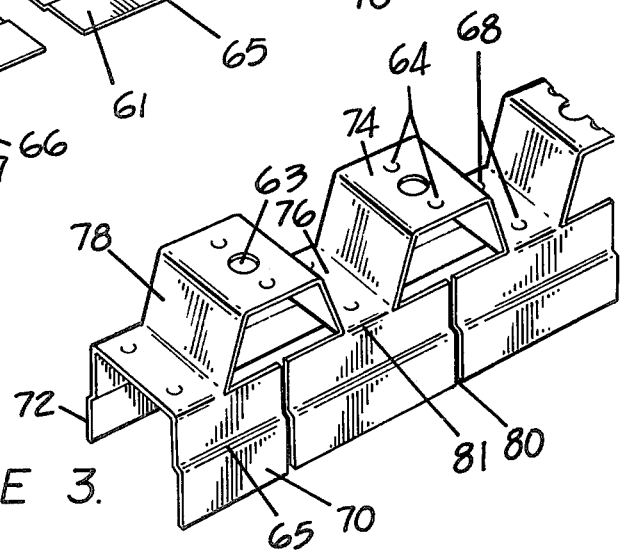
FIG. 3 is a detailed view of the formed three-dimensional segments.

The substantially flat material is then fed into a progressive die, generally designated by 32, for cutting, blanking and forming the sheet into a three-dimensional continuous article, 34, as better seen in FIGS. 2 and 3. The three-dimensional continuous article is then fed into cleaning and surface treatment baths, generally depicted as 36, and oven 38 for drying prior to adhesive application and bonding. In case of a stainless steel material, the material is first alkaline cleaned, rinsed, treated in a surface treatment bath, again rinsed and then dried in an air-circulating oven. The dry pretreated material is then coated with a suitable adhesive, via adhesive applicator 40, 42 and 44, which apply adhesive to both surfaces of the middle portion and to the sidewalls of the article. Alternately, a brazing material may be applied at this step, although since this generally adds considerable weight to the panel, welding is the preferred alternate to adhesive bonding. Adhesive applicator 40 applies adhesive to the side portion of the article, including any flange on the peaks. Adhesive applicators 42 and 44 apply adhesive to the top and bottom portions of the middle segment of the article respectively. The adhesive is then dried in oven 46 and cut into segments by cutter 48. Segments are cut so that when the edges of the segments are aligned, the troughs of one segment mate with the peaks of the next segment. The cut segments 50 are then transported via conveyor 51 for stacking. The segments are turned 90 degrees as generally shown at 52, so they are positioned on their sides, and then are aligned at 53 against a stop 54 for stacking to form the stacked configuration shown at 55. The stacked configuration is then laminated together and the adhesive is cured. The segments may be stacked into a holding jig for moving to a separate laminating press, or where a completely continuous operation is desired, they may be laminated via moving platens 56 and 57 on a conveyor system, not shown. The panels, after lamination, may be readily cut and trimmed as desired. It should be noted that it is much easier to handle a finished panel for cutting and trimming than separate core material.

It will be understood that the pretreatment steps and adhesive application will vary depending upon the web material used. Alternately, the material may be bonded after stacking, via, for example, a resistance welding operation as, for example, the welding operations of Campbell as generally taught in U.S. Pat. Nos. 2,910,153, 2,930,882 and 3,077,532. Referring to FIG. 1a, after each segment is stacked and aligned, electrodes 58 and 58' separated by insulator 58a are positioned in contact with the underside of each segment, as shown by the arrows, including any flange portion as can best be seen in FIG. 10. Welding rollers 59 and 59' are then moved across the outer surface to weld the flanges to the segment above it, and then moved back to weld the overlapping sides. Electrodes 58 and 59 are connected to a suitable power source, not shown.

Figure 4:
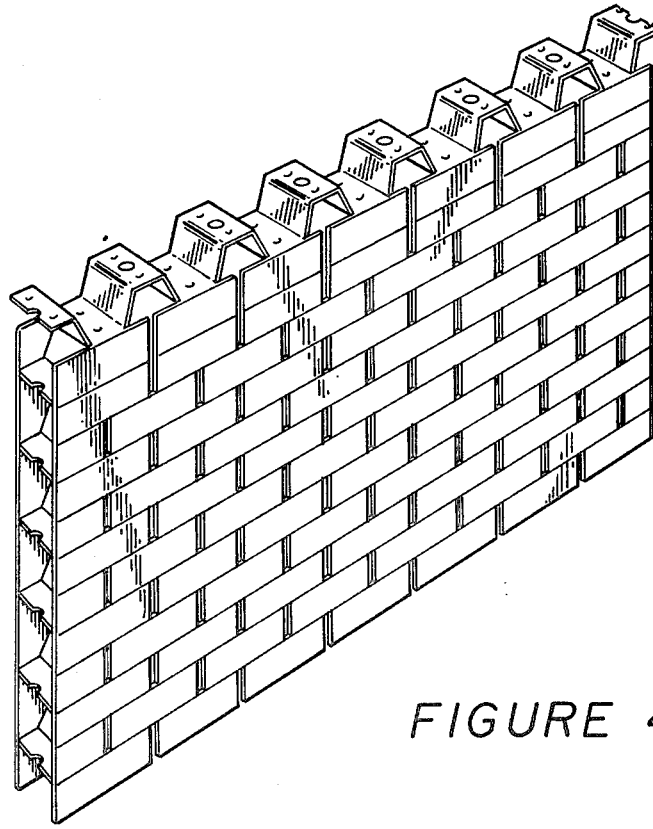
FIG. 4 is a view of the cellular core panel formed from the stacked segments of FIG. 3.

Referring now to FIGS. 2 to 4, the process of forming the panel from the web configuration is illustrated. In the forming operation, the web 20 is blanked and formed in a progressive die operation. Two side portions 60 and 61 and a continuous middle portion 62 are formed from the web and positioning or pilot holes 63 are pierced at predetermined increments along the middle portion of the web for aligning a die pilot pin used for properly positioning and aligning the web material for the subsequent blanking and folding operations. The pilot holes also serve to reduce the weight of the panel as well as permit fluid communication between cells. If greater weight reduction is desired, additional holes may be pierced at this step. Also, registering means 64 and 68 are formed by indenting the middle portion of the web material to aid in aligning the segments during the stacking operation and to provide shear strength at the nodes for when the finished panel is loaded as a beam. The protrusions of 64 are dimensioned so they will seat into the indentations of 68, thus allowing the trough of one segment to contact the peak of the next segment. Also, during blanking, steps 65 may be formed so that stacked segments form a substantially smooth outer surface with uniform thickness. Side portions 60 and 61 are cut with removal of material at 66 and slits at 67 to permit forming of the middle section. The distance between the upper and lower edge of the side portion must be at least twice the vertical distance between the peaks and troughs of the formed middle section to permit adequate overlap of the stacked segments. The cut, flat web material is then bent and formed, via the conventional forming techniques of a progressive die operation, into a three-dimensional shape having sidewalls 70 and 72 and a top portion containing peaks 74 and troughs 76 formed from the continuous middle section. Alternately, instead of blanking spaces 66, if the web material possesses sufficient elongation properties, the middle portion may be stretched to form such spaces in which case the three-dimensional configuration may be formed on a rotary die machine.

Figure 5:
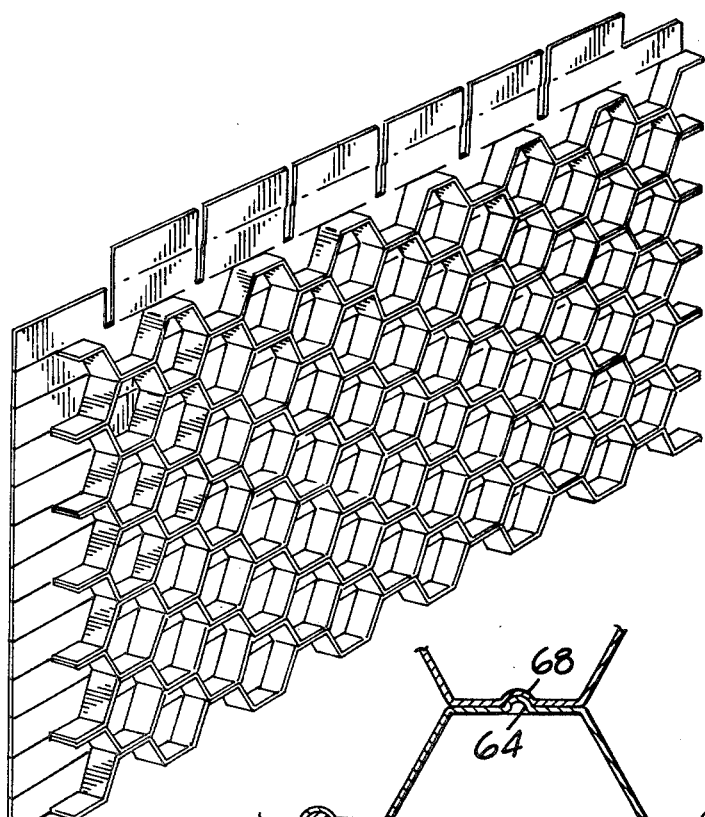
FIG. 5 is a panel slice through the center of the formed panel, illustrating the honeycomb core configuration or alternately, shows a stacked panel using only one sidewall.
Figure 6:
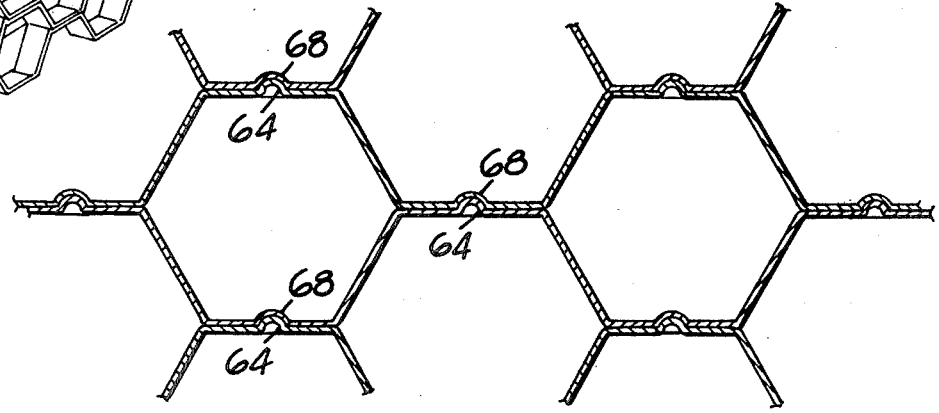
FIG. 6 is a detailed cross-section of the core shown in FIG. 5.

In the preferred embodiment, the top portion of the peak 74, and the bottom portion of the trough, 76, as well as the inclined sections 78, are flat rectangular areas of substantially the same dimension, so that when the segments are stacked together, a hexagonal shaped cellular core configuration is obtained as can best be seen from FIGS. 5 and 6. However, it will be understood that a smooth, continuous sinusoidal type curve may also be formed, to give a curved cellular configuration. Also, where greater strength is required in one direction than the other, isotropic properties can be obtained by varying the size of the peaks and troughs as well as the angle and size of the inclined portion between them. For example, a generally square cell configuration can be obtained by minimizing or eliminating the top peak and bottom trough areas in which case the inclined portions will mate to form a substantially square cell configuration. Where enhanced physical properties are required along the "ribbon" direction of the core, the trough and peak areas may be increased and the inclined portions between them minimized. Finally, a substantially square or rectangular configuration normal to the ribbon direction may be obtained by forming the inclined portion so it is substantially perpendicular to the peak and trough areas.

Protrusions 64 and 68 are spaced, as best can be seen in FIGS. 3, and 6, so that complimentary protrusions and indentations are formed on each peak and trough and are dimensioned to nest into each other for aligning the segments upon stacking. Also, spaces 66 and slits 67, cut in the flat sheet, as shown in FIG. 2, are such that upon bending the middle portion into troughs and peaks, as seen in FIG. 3, the side portions 60 and 61 meet to form a sidewall with thin slits 80. Unlike conventional laminated panels, the sidewall portion is integral with the trough at 81 to give greater structural integrity and to minimize problems of sideways slippage during laminating. The segments are then stacked and laminated to form a completed panel as shown in FIG. 4.

FIGS. 5 and 6 illustrate the honeycomb type configuration obtained via stacking the segments produced from the continuous sheet. The protrusions 64 of the peaks of one segment mate with the indentations 68 of the troughs of the segment above it to align the substantially equal rectangular areas into a symmetrical hexagonal configuration. It will be, of course, understood that although a set of protrusions are illustrated on the top surface of each peak with complimentary indentations on the bottom surface of each trough, the top surface of each peak may contain indentations and the bottom surface of each trough may contain protrusions. Also, where the stacking means properly aligns the segments, the segments need not contain registration means at all, or may contain fewer registration areas.

Referring more specifically to FIG. 5, a slice through the center of a double-faced panel is shown. However, it should be understood that for certain applications only one face sheet may be required or a dissimilar face sheet may be desired on one side. For these applications, the three-dimensional segments may be manufactured with only one sidewall, in which case the stacked panel will appear as shown in FIG. 5.

Figure 7:
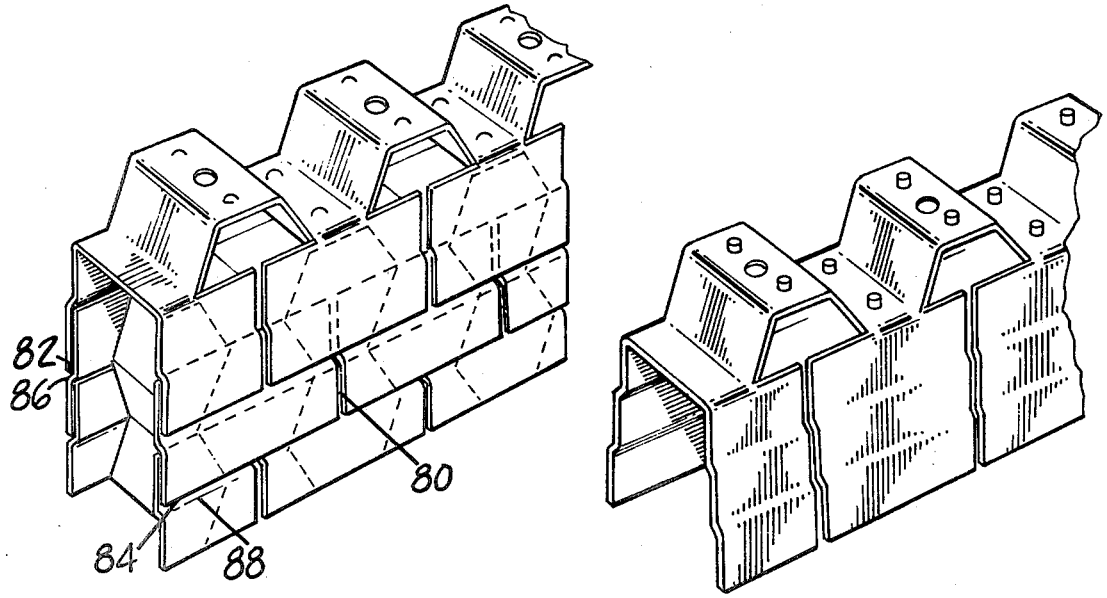
FIG. 7 is a detailed view of stacked segments illustrating a single step configuration of the stacked segments.
Figure 8:
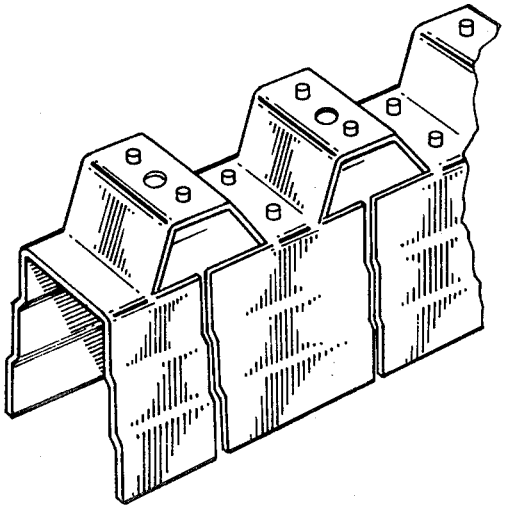
FIG. 8 illustrates an alternate embodiment of the invention, utilizing multiple steps and cylindrical shaped nesting protrusions for increased shear stress resistance.

Referring to FIG. 7, upon positioning the trough of one section onto the peak of the segment below it, the bottom edge of the sidewall 82 and 84 abut the step of the sidewall of the segment below it, 86 and 88. The bottom half of slit 80 is covered via the segment of the sidewall beneath it, while the top half of slit 80 is covered via the segment of the sidewall above it to give an impervious outer skin. The step is substantially the thickness of the sheet material, so that a substantially smooth outer surface of constant thickness is obtained when one segment is overlaid on the next. The sidewall steps should be spaced so that upon mating of the segments, one sidewall segment substantially abuts the step of the next. However, where greater overlap is desired, the sidewalls may be made proportionately longer for each segment and a number of steps may be provided to compensate for the additional thickness buildup, as generally illustrated in FIG. 8. Each step should generally be spaced a distance equal to the vertical distance between the peaks and troughs.

Also, as illustrated in FIG. 8, the indentations and protrusions previously shown in the form of small dimples, which are easily stamped into the sheet material, may be formed larger and higher or deeper where additional resistance to shear stress is desired between segments. The protrusions and indentations may be cylindrical or conically shaped, so that the mated segments have added shear resistance along the mated surfaces.

Figure 10:
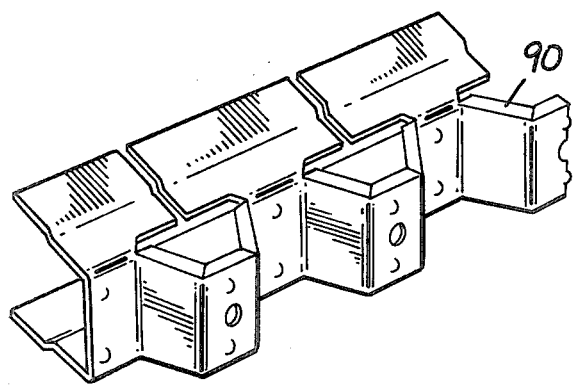
FIG. 10 illustrates the three-dimensional segment formed from the sheet of FIG. 9, in which a flange portion is formed.
Figure 9:
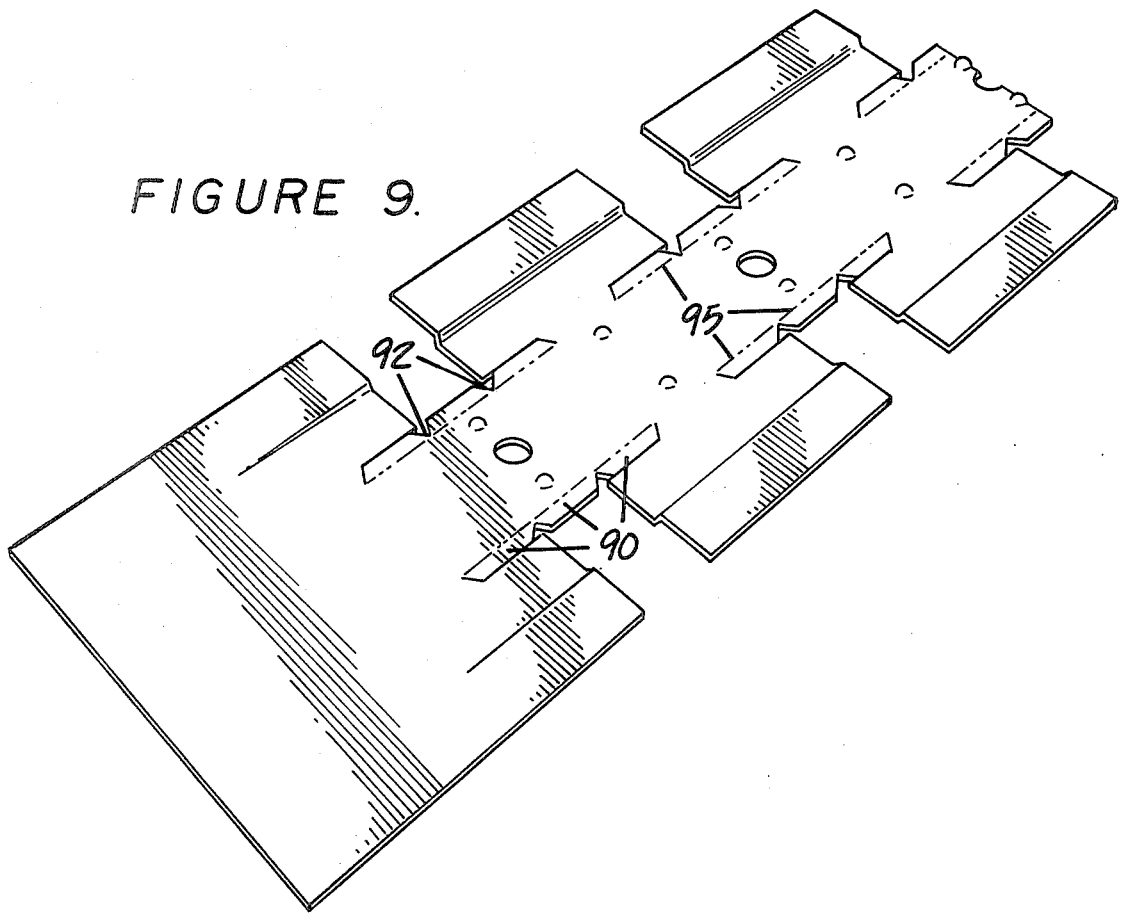
FIG. 9 illustrates an alternate method of stamping the flat ribbon sheet.

Referring now to FIGS. 9 and 10, an alternate embodiment of the present invention is illustrated in which the flat sheet is cut to provide a flange portion on the peak areas of the segments. Upon forming the cut sheet into the three-dimensional configuration, a flange portion 90 is formed which provides an additional bonding surface between a segment and the inner surface of the side portion of the segment above it. Notches, 92, are cut in the flat stock and upon formation of the undulating peaks and troughs, the notched edge portion is formed into a flange border by folding at 95. Such a flange is important in providing a surface for resistance welding as was discussed with reference to FIG. 1a.

Referring now to FIGS. 11, 12 and 13, for particular applications, such as accoustical panels, vacuum tables, or where the core to be filled with a fluid material which requires openings in the skin of the structural panel, openings 96 and 98, may be readily pierced during the initial cutting and blanking operations, as generally illustrated in FIGS. 11 through 13. Also, positioning holes 63 and 63a pierced in the peak and trough areas respectively permit fluid communication between cells. As illustrated in FIG. 13, the final panel may be closed out at its edges, via conventional U-shaped closeout 100, such closeouts being well known in the art.

The panels of this invention may be fabricated more economically than structural panels laminated with separate skins, and where close dimensional tolerances are required, the panel may be formed in one continuous forming, cutting, stacking and bonding operation via conventional handling equipment. Also, unlike conventionally laminated panels, since the skins and core beneath it are integrally connected, there is less likelihood of delamination, even if a marginal bonding job has been performed. Such panels find application for a wide range of uses, including structural panels of all types, decorative panels, bulkheads, floors, platforms, decks, tooling boards, vacuum tables, doors, cabinets, partitions, concrete forms, shelves, furniture, motor vehicle bodies, etc. In addition, the skin formed from the stacked segments contains joints which it is believed permit local expansion of the skin during thermal cycles. Such expansion joints would be difficult to obtain via conventional skin lamination techniques. Also, where odd shaped panels are required, such as a U- or L-shaped panel, the segments may be cut to different lengths and stacked to provide such shapes with a minimum of cutting and trimming of the final panel. Finally, these segments may be fabricated as a separate article of manufacture, available in varying lengths to provide a means of fabricating panels of varying shapes and sizes by simply stacking and bonding the segments together. For small manufacturers or home use, the segments may be handstacked and bonded with C-clamps or similar hand tools.

Where it is desirable to provide a smooth continuous outer face, a thin sheet or a coating may be applied to the formed structural panel. Also, where a thicker outer face is required, or one which differs in composition from the core, it can be easily applied to the flat smooth panel.

Having thus described the various features of my invention, including the process or forming the unique component segments, and stacking the segments to form the cellular core panel, I claim:

1. A product comprising a single formed sheet, said sheet being characterized by a top portion having repeating peaks and troughs and at least one sidewall, at least a portion of the upper edge of which is integral with and substantially perpendicular to the side edge of said trough, the sidewall being formed by folding the sheet at the side edge of said trough, and the distance between the upper and the lower edge of said sidewall is at least twice the vertical distance between the peaks and troughs, whereby upon stacking and aligning said products together, a cellular core structural panel is formed.

2. The product of claim 1 wherein each sidewall portion of said sheet has at least one step approximately the thickness of said sheet, whereby upon stacking of said product, a cellular core structrual panel with a substantially uniform thickness outer surface formed from said sidewall is obtained.

3. The product of claim 1 wherein said peak comprises a flange side portion.

4. The product of claim 1 wherein said troughs and peaks comprise a flat rectangularly shaped top peak, a flat rectangularly shaped bottom trough and a flat rectangularly shaped, inclined portion between said top peak and bottom trough, said top peak, bottom trough and inclined portion having substantially the same rectangular area whereby upon stacking and aligning said products together, a structural panel is formed, having a hexagonal cell core.

5. The product of claim 1 wherein the top portion has a registering means for aligning a peak with a trough when stacking said products together.

6. The product of claim 4 having a registering means comprising at least one set of complimentary protrusions and indentations whereby upon stacking said products together, the protrusions mates with the indentation to align said products.

7. The product of claim 5 wherein said protrusions and indentations are cylindrically shaped to provide resistance to shear stress of a structural panel formed therefrom.

8. A product comprising a single formed sheet, said sheet being characterized by a top portion having flat, rectangularly shaped top peaks, flat rectangularly shaped bottom troughs and flat rectangularly shaped inclined portions between said top peaks and bottom troughs, said top peaks, bottom troughs and inclined portions having substantially the same rectangular area, said top portion having registering means comprising complimentary indentations and protrusions on the top surface of the peaks and on the bottom surface of the troughs; at least one sidewall, a portion of the upper edge of which is integral with and substantially perpendicular to the side edge of the bottom troughs, the sidewall being formed by folding the sheet at the side edge of said trough, and the distance between the upper and lower edge of said sidewall is at least twice the vertical distance between the peaks and troughs, and having at least one set of steps approximately the thickness of said sheet, whereby upon stacking of said product, a cellular core structural panel with a substantially uniform thickness outer surface formed from said sidewall is obtained.

9. The product of claim 8 wherein the top peaks and inclined portions comprise a flange side portion.

10. The process of forming a cellular core structural panel comprising the steps of:
forming from a flat continuous single sheet material a three-dimensional structure having a top portion with repeating peaks and troughs and having at least one sidewall, a portion of the upper edge of which is integral with and substantially perpendicular to the side edge of said troughs, the sidewall being formed by folding the sheet at the side edge of said trough, and the distance between the upper and the lower edge of said sidewall is at least twice the vertical distance between the peaks and troughs;
cutting said continuous formed single sheets into segments;
stacking said segments together such that the peaks of one segment are aligned with the troughs of the segment above it;
bonding said segments together whereby a cellular core structural panel is formed.

11. The process of claim 10 with the additional step of applying adhesive to the formed sheet material prior to stacking the segments.

12. The process of claim 10 wherein the segments are bonded together via a welding operation.

13. The process of claim 10 wherein the three-dimensional structure is formed via blanking and bending said flat sheet.

14. The process of claim 10 wherein the forming step includes a punch step wherein at least one set of complimentary protrusions and indentations on the top surface of the peak and the bottom surface of the trough are formed in each segment and said protrusions and indentations are mated to align the segments during the stacking step.

15. The process of claim 10 wherein the forming steps include a punch step for forming a flange on the peaks of said top portion.

16. The process of claim 10 wherein the forming step includes forming at least one set of steps the approximate thickness of the sheet in the sidewall portion of the sheet, whereby during the stacking step the bottom edge of the sidewall of each segment abuts the step of a sidewall beneath it whereby a cellular core structural panel with a substantially uniform thickness outer surface is obtained.

17. The process of forming a cellular core structural panel comprising the steps of:
blanking a flat continuous ribbon sheet to form a continuous middle section along the longitudinal axis of the ribbon sheet and at least one cut side section a portion of which is integral with said middle section;
forming protrusions and indentations in said middle section and at least one set of steps the approximate thickness of the sheet in said side sections;
folding the side section from the middle section approximately 90 degrees and folding the middle section to form flat rectangularly shaped top peaks, flat rectangularly shaped bottom troughs and flat rectangularly shaped inclined portions between said peaks and troughs, said peaks, troughs and inclined portions having substantially the same rectangular area, the bottom troughs being integral with said side section, and the distance between the upper and the lower edge of said sidewall is at least twice the vertical distance between the peaks and troughs, and the protrusions and indentations forming at least one set of complimentary indentations and protrusions on the top surface of one of the peaks and the bottom surface of one of the troughs;
cutting said formed sheet into segments;
stacking said segments such that said complimentary set of indentations and protrusions mate to align the peaks of one segment with the troughs of the segment above it, and the bottom edge of the sidewall substantially abuts a step of the segment beneath it;
bonding said segments together whereby a uniform hexagonal core structural panel with a substantially flat outer surface is obtained.

18. The process of claim 17 with the additional step of applying adhesive to the formed sheet prior to stacking the segments.

19. The process of claim 17 wherein the segments are bonded via a welding operation.

20. The process of claim 19 wherein the segments are resistance welded by positioning an electrode on the inside surface of each sidewall segment as it is stacked and moving across the outside surface of each sidewall segment a welding roller.

21. A cellular core structural panel comprising:
a plurality of bonded stacked segments, said segments being formed from a single sheet characterized by a top portion having repeating peaks and troughs and at least one sidewall at least a portion of the upper edge of which is integral with and substantially perpendicular to the side edge of said troughs, the sidewall being formed by folding the sheet at the side edge of said trough, and the distance between the upper and the lower edge of said sidewall is at least twice the vertical distance between the peaks and troughs, and said stacked segments being aligned so that each peak contacts the trough of the segment above it whereby the top portions of said segments form a cellular core and the sidewalls form the face sheets of the panel.

22. The panel of claim 21 wherein the sidewall portions of the segments have at least one step approximately the thickness of said sheet, so that the bottom edge of the sidewall of each segment abuts a step of the sidewall beneath it whereby the facesheets formed from said sidewalls are substantially flat.

23. The panel of claim 21 wherein the peak comprises a flange portion bonded to the inner surface of the sidewall of the segment stacked over it.

24. The panel of claim 21 wherein said troughs and peaks comprise a flat rectangularly shaped top peak portion, a flat rectangularly shaped bottom trough portion and a flat rectangularly shaped inclined portion between said top peak and bottom trough portions, said top peak, bottom trough and inclined portions having substantially the same rectangular area, the upper faces of said top peaks being bonded to the lower faces of the bottom troughs of the segment above it to form a uniform hexagonal core.

25. The panel of claim 21 wherein the top portion of each segment has a registering means aligning the segments.

26. The panel of claim 25 having a registering means comprising at least one set of complimentary protrusions and indentations, mating an upper face of the top peaks to a lower face of the bottom trough of the segment above it.

27. The panel of claim 26 wherein the protrusions and indentations are cylindrically shaped to provide greater resistance to shear stress.

28. The panel of claim 21 wherein the panel segments are adhesively bonded.

29. The panel of claim 21 wherein the panel segments are welded.

30. The panel of claim 21 wherein the face sheets contain openings therein.

31. The panel of claim 21 wherein the peaks and troughs contain openings therein to permit fluid communication between cells formed therefrom.

32. A cellular core structural panel comprising:
a plurality of bonded stacked segments, each segment being formed from a single sheet characterized by a continuous top portion having repeating peaks and troughs consisting of a flat rectangularly shaped top peak portion, a flat rectangularly shaped bottom trough portion and a flat rectangularly shaped inclined portion between said top peak and bottom trough portions, said top peak, bottom trough and inclined portions having substantially the same rectangular area, the upper surfaces of said top peaks being bonded to the lower surfaces of the bottom troughs of the segment above it and said surfaces having complimentary protrusions and indentations mated together; two sidewalls at least a portion of the upper edge of which is integral with and substantially perpendicular to the side edge of the bottom trough portion, the sidewalls being formed by folding the sheet at the side edge of said trough and the distance between the upper and lower edge of said sidewalls being at least twice the vertical distance between the peaks and troughs, and having at least one set of steps approximately the thickness of the sheet, and said segments being stacked so that the bottom edge of the sidewall of each panel abuts a step of the sidewall beneath it whereby a panel with a substantially uniform hexagonal cell core and substantially flat facesheets is obtained.

* * * * *